United States Patent [19]
Maguire

[11] Patent Number: 5,319,927
[45] Date of Patent: Jun. 14, 1994

[54] DUCTED FAN GAS TURBINE ENGINE
[75] Inventor: Addison Maguire, Derby, England
[73] Assignee: Rolls-Royce plc, London, England
[21] Appl. No.: 67,853
[22] Filed: May 27, 1993
[30] Foreign Application Priority Data
  Jul. 18, 1992 [GB] United Kingdom ............... 9215316
[51] Int. Cl.⁵ .................................... F02K 3/02
[52] U.S. Cl. ......................... 60/226.1; 60/39.07; 60/39.83
[58] Field of Search ............ 60/39.07, 39.31, 39.83, 60/226.1, 226.3

[56] References Cited
U.S. PATENT DOCUMENTS

| | | | |
|---|---|---|---|
| 3,842,597 | 10/1974 | Ehrich | 60/226.1 |
| 4,254,618 | 3/1981 | Elovic | 60/226.1 |
| 4,477,040 | 10/1984 | Karanik | . |
| 4,865,267 | 9/1989 | Severson | . |
| 5,038,560 | 8/1991 | Seed | 60/39.83 |
| 5,123,242 | 6/1992 | Miller | 60/39.83 |
| 5,203,163 | 4/1993 | Parsons | 60/39.07 |

FOREIGN PATENT DOCUMENTS
1055264  2/1954  France .
2205903 12/1988  United Kingdom .

*Primary Examiner*—Louis J. Casaregola
*Attorney, Agent, or Firm*—Cushman, Darby & Cushman

[57] ABSTRACT

A ducted fan gas turbine engine has a fan duct across which extends an aerodynamically configured fairing. The fairing has a leading edge region which is defined by a pair of doors. The doors pivot between a first position in which they define the fairing leading edge region and a second position in which they define an inlet for the flow of air into the fairing. The air flow into the fairing serves to provide cooling of components within the fairing.

5 Claims, 2 Drawing Sheets

DUCTED FAN GAS TURBINE ENGINE

FIELD OF THE INVENTION

This invention related to ducted fan gas turbine engines and in particular to the tapping of air for cooling purposes from the fan ducts of such engines.

BACKGROUND OF THE INVENTION

It is necessary to blend air from the compressor of an aircraft-mounted gas turbine engine in order to drive pneumatically powered aircraft accessories and to provide pressurised cabin air. Usually the air is bled from the higher pressure compressor regions and as a consequence is often at relatively high temperature. The high temperature of the air can be a problem when it is directed through pipes contained within the main structure of the aircraft, in particular its wings. Moreover, the majority of the air bled from the engine is used for purposes which do not require the air to be hot. Conventionally therefore, the air is cooled immediately after it has been bled from the engine compressor.

In a ducted fan gas turbine engine, the bled air is directed through pipes which have to pass across the fan duct en route to the main aircraft structure. Typically, therefore, the pipes are located within the fairing which encloses the engine mountings, fuel pipes etc and extends across the upper region of the fan duct. The cooling of the bled air takes place within this fairing in a heat exchanger commonly referred to as a precooler. Air tapped from the fan exhaust air flowing through the fan duct is directed to the precooler in order to provide cooling of the bled air. The tapped fan air usually enters the fairing through an inlet provided in the outer surface of the fairing. However control must be exerted over the tapped air flow. This is because the temperature of the air bled from the compressor varies in accordance with the operation of the engine: The lower the speed of aircraft the hotter the supply of compressed air because of the operation of the bleed system which is required to supply high pressure air against falling engine thrust/speed. In the past this control has been provided by an on/off valve located within the fairing. When the air bled from the compressor is relatively cool, the valve is switched off so that no fan air is tapped off and directed to the precooler. However when the engine is operating under conditions which result in the bled air being too hot, the valve is opened to permit a flow of fan air to the precooler.

As the power outputs of ducted gas turbine engines have risen, the temperatures of the air within the compressors of those engines have risen correspondingly. This has been even more pronounced with the trend towards fitting large aircraft with smaller numbers of engines. Thus whereas in the past, larger aircraft have been fitted with four engines, there is now a trend towards fitting new aircraft in this size category with three or two high power engines. As a result of this, the demand for the cooling of the air bled from the engine has increased. It is now frequently desirable that the bled air should be cooled over a larger proportion of engine operating conditions and that, in the interests of efficiency, the flow of tapped fan air used for cooling should be capable of being varied over a range of flow rates.

SUMMARY OF THE INVENTION

It is an object of the present invention to provide a ducted fan gas turbine engine in which means are provided to bring about effective modulation of the flow of air from the fan duct to the precooler and which provide minimal disturbance to the remainder of the air flowing through the fan duct.

According to the present invention, a ducted fan gas turbine engine comprises means defining a generally annular fan duct across which extends an aerodynamically configured fairing, said fairing including an upstream facing leading edge region having doors movable between a first, fully closed position in which they cooperate to at least partially define said leading edge region, and a second, fully open position through positions in which they define an intake for the flow therethrough into the interior of said fairing of a portion of the air flow operationally flowing through said fan duct.

BRIEF DESCRIPTION OF THE DRAWINGS

The present invention will now be described by way of example, with reference to the accompanying drawings in which.

DETAILED DESCRIPTION OF THE INVENTION

Figure 1:
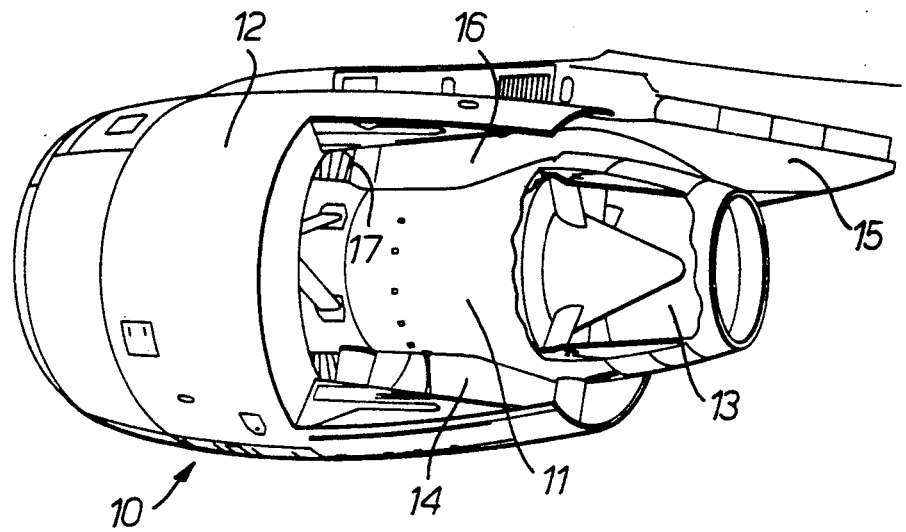
FIG. 1 is a partially broken away rear three-quarter view of a ducted fan gas turbine engine in accordance with the present invention.

Referring to FIG. 1, a ducted fan gas turbine engine generally indicated at 10 is of generally conventional construction. It comprises a gas generator core 11 which is surrounded in radially spaced apart relationship by a nacelle 12. Part of the nacelle 12 has been omitted in order to facilitate improved visibility of the gas generator core 11. Similarly part of the outer casing of the gas generator core 11 has been omitted in order to facilitate improved visibility of the rear of the gas generator core 11.

The gas generator core 11 provides propulsive thrust through its exhaust nozzle 13 and also drives a ducted fan (not shown) located at the front of the nacelle 12. The exhaust from the fan passes through an annular fan duct 14 defined between the gas generator core 11 and nacelle 12 before exiting the engine 10 to provide additional propulsive thrust.

The engine 10 is mounted from the underside of an aircraft using in the conventional manner by means of a pylon 15.

A cross-duct aerodynamically configured fairing 16 interconnects the nacelle 12 and gas generator core 11 over a substantial extent of the length of the core 11. The fairing 16 is located along the top of the gas generator core 11 and contains the mountings which attach the core 11 to the pylon 15. It also contains various pipes and wiring which provide communication between the gas generator core 11 and the aircraft upon which it is mounted. Thus, for example, the fairing 16 contains pipes which supply fuel to the gas generator core 11 and pipes which direct compressed air bled from the core 11 to the aircraft.

The compressed air is bled from the high pressure compressor of the gas generator core 11. Consequently the air is at elevated temperature as a result of its compression. Under certain engine operating conditions, the air is too hot for its intended purposes (for instance for cabin pressurisation) and must therefore be cooled. In order to reduce the temperature of the air to a level which is acceptably low, a heat exchanger (not shown) is provided within the fairing 16. The heat exchanger places the hot air in heat exchange relationship with some of the cool air which operationally flows through the fan duct 14. Cool air tapped from the fan duct 14 is directed into the fairing 16 interior through an inlet provided on the leading edge region 17 of the fairing 16.

Figure 2:
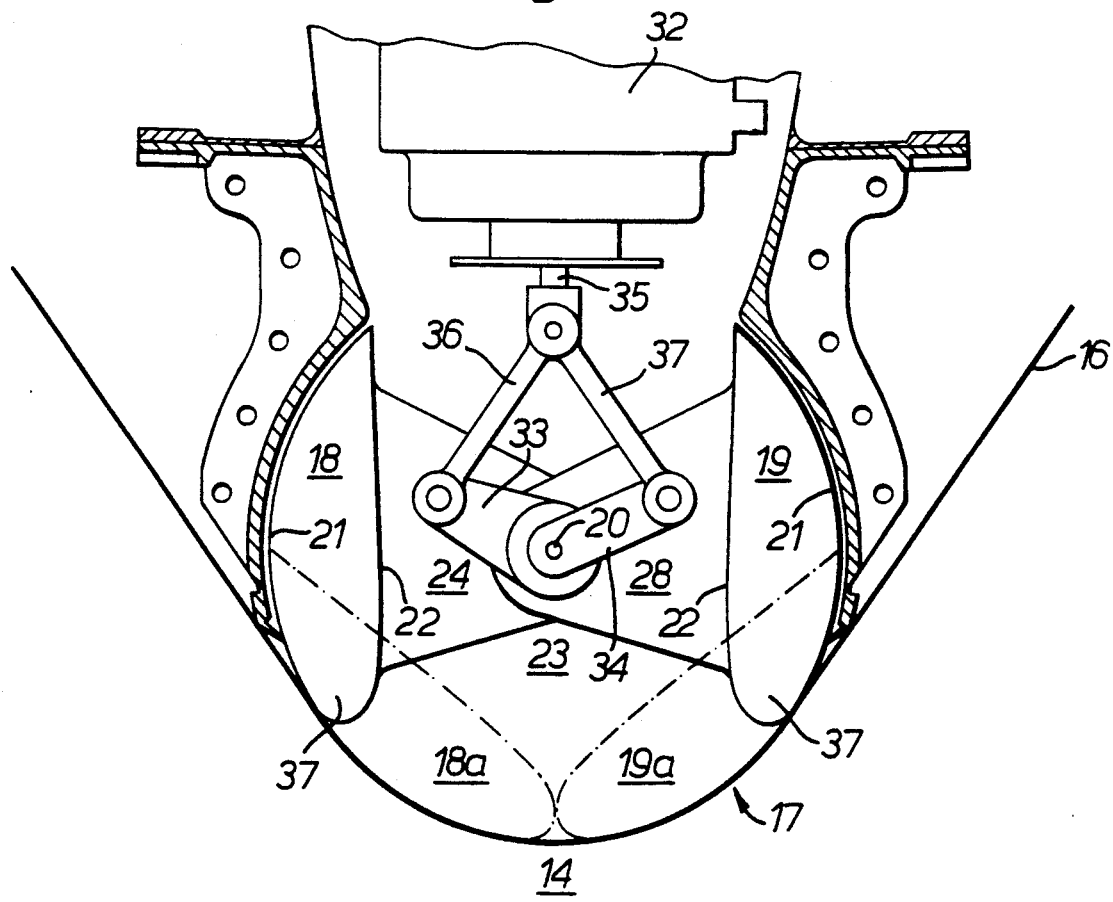
FIG. 2 is a view in radially inward direction of the leading edge region of a cross-duct fairing in the ducted fan gas turbine engine shown in FIG. 1.
Figure 3:
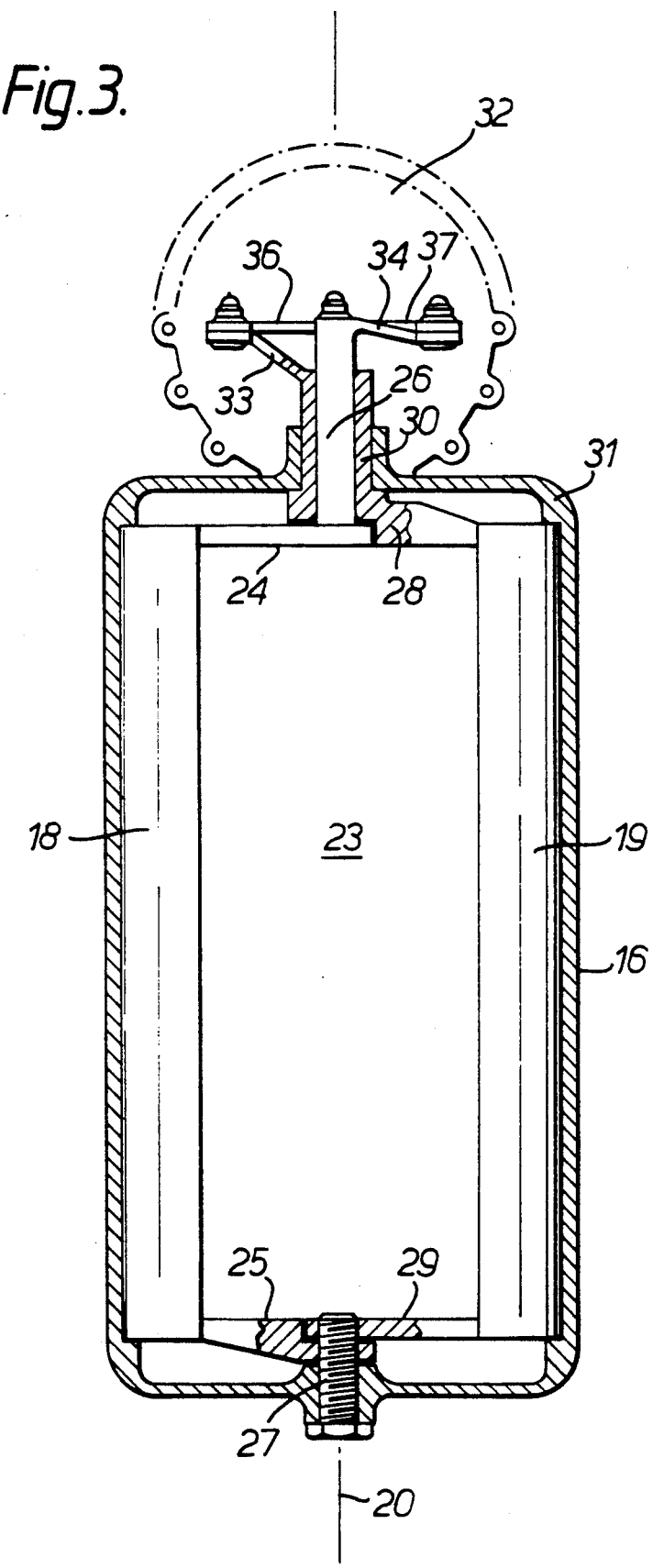
FIG. 3 is a view in an axially downstream direction of the fairing leading edge region shown in FIG. 2.

The fairing leading edge region 17 can be seen more easily if reference is now made to FIGS. 2 and 3. Basically the majority of the radial extent of the leading edge region 17 of the fairing 16 is defined by two similar doors 18 and 19. The doors 18 and 19 are pivotable about a common radial axis 20 between a first, closed position in which they are shown in interrupted lines at 18a and 19a and a second, fully open position in which are shown in solid lines.

The doors 18 and 19 each have a mostly part-cylindrical outer surface 21 so that the majority of the outer surface 21 of each door 18 and 19 is equi-distant from the common axis 20. It will be seen therefore that in cross-section most of part cylindrical outer surface 21 of each door 18 and 19 defines a part of the circumference of a notional circle having as its centre the common radial axis 20. When the doors 18 and 19 are closed as shown at 18a and 19a, their outer surfaces define a major proportion of the leading edge region 17.

The inner surfaces 20 of the doors are substantially flat. When the doors 18 and 19 are open, their flat inner surfaces 22 define an intake 23 for the flow of air from the fan duct 14 into the interior of the fairing 16. When the doors 18 and 19 are fully open as shown in solid lines in FIG. 2, the flat inner surfaces 22 define a straight entry for air flowing into the interior of the fairing 16.

The transition region 37 between the curved and flat surfaces 21 and 22 of the leading edges of each of the doors 18 and 19 is of curved cross-sectional form so as to cause as little disturbance as possible to the air flowing over it.

The doors 18 and 19 are of basically similar construction. The door 18 is provided with arms 24 and 25 at each of its radial extents. The arms 24 and 25 are normal to the door 18 and constitute its sole means of support. The radially outermost arm 24 has an integral shaft 26 which is parallel with the door 18 and coaxial with the axis 20. The radially innermost arm 25 is apertured to permit its location on a shaft 27 which is coaxial with the axis 20 and is attached to a frame 31 which is a part of the fairing 16.

The door 19 is similarly provided with radially outward and inward arms 28 and 29. The radially outward arm 28 is provided with a sleeve 30 which locates on the shaft 26 and the radially inward arm 29 is apertured to permit its location on the shaft 27. The sleeve 30 is supported for rotation by the frame 31.

It will be seen therefore that the doors 18 and 19 are pivotable about the axis 20 between open and closed positions.

The doors 18 and 19 are actuated by a pneumatic servo unit 32. The shaft 26 and sleeve 30 are respectively provided with arms 33 and 34 and are respectively attached to the output shaft 35 of the pneumatic servo unit 32 by link rods 36 and 37. Pivots at their various points of the attachment permit the link rods 36 and 37 to pivot relative to the arms 33 and 34 as well as the servo output shaft 35. It will be seen therefore that linear actuation of the pneumatic servo unit 32 causes the doors 18 and 19 to pivot about the axis 20 through a plurality of positions between fully open and fully closed.

When the engine 10 is operating with low air bleed flow and pressure conditions, the doors 18 and 19 are maintained in the closed position shown at 18a and 19a. Under these conditions, cooling of the compressed air bled from the high pressure compressor of the gas generator core 11 is unnecessary. The doors 18 and 19 therefore cooperate to define the leading edge region 17 of the fairing 16. Since the doors 18 and 19 are so configured as to be generally complementary in shape with the remainder of the fairing 16, the fairing 16 in its totality creates only minimal disturbance to the air flow through the fan duct 14.

When the air bleed flow and pressure requirements are increased, there is a corresponding increase in the temperature of the compressed air bled from the core 11 high pressure compressor. The temperature quickly reaches a level which is unacceptably high. At this point, the doors 18 and 19 are opened to allow cool air from the fan duct 14 to flow into the interior of the fairing 16 through the intake 23. The doors 18 and 19 are only opened wide enough to allow sufficient fan duct 14 air to flow into the fairing 16 to bring about the desired degree of cooling of air bled from the core 11. A simple feed back system can be used to achieve this end. Essentially the temperature of the air bled from the core 11 is monitored and an appropriate signal is sent to the pneumatic servo unit 32 to ensure that the doors 18 and 19 are opened to an appropriate extent. Alternatively the opening of the doors 18 and 19 can be linked to the aircraft cabin air requirements. Cabin air flow and other aircraft requirements are controlled by the aircraft computer which in turn inputs to the engine control system.

When the doors 18 and 19 are open, there is little obstruction to the airflow into the fairing 16. This ensures that pressure losses of the airflow within the fairing 16 are minimised. Moreover the positions of the doors 18 and 19, when open, is appropriate for the particular power output of the engine 10. This means that for a given engine 10 power output only an appropriate amount of air from the fan duct 14 flows into the fairing 16. Consequently, the spillage of air from the intake 23 around the fairing 16 is minimised. Such spillage is looked upon as being undesirable in view of the detrimental effect it has upon the efficiency of the air flow over the fairing 16 in particular and through the fan duct 14 in general.

As the doors 18 and 19 are opened further to accommodate increased air flow rates, the more the internal door surfaces 22 define a straight entry for the air flow into the interior of the fairing. This encourages parallel streamlines in the air flow with the result that the majority of the diffusion of the air flow will be within the fairing 16. Limiting the diffusion region to the interior of the fairing 16 ensures that there is reduced disturbance to the general air flow through the fan duct 14.

I claim:

1. A ducted fan gas turbine engine comprising means defining a generally annular fan duct, an aerodynamically configured fairing which extends across said fan duct, said fairing including an upstream facing leading edge region having doors movable between a first, fully closed position in which they cooperate to at least partially define said leading edge region, and a second, fully open position through positions in which they define an intake for the flow therethrough into the interior of said fairing of a portion of the air flow operationally flowing through said fan duct, each of said doors being pivotally mounted about a common axis and each of said doors extending generally in a plane, each of said doors being provided with an arm extending in a direction generally normal to said respective plane, said arms interconnecting their associated doors with means facilitating said pivotal movement about said common axis, each of said doors being provided with an outer surface which is part cylindrical, the majority of said part cylindrical outer surface of each door being equi-distant from said axis.

2. A ducted fan gas turbine engine as claimed in claim 1 wherein there are two of said doors.

3. A ducted fan gas turbine engine as claimed in claim 1 wherein each of said doors is provided with a generally flat inner surface to define a straight entry for air flowing into said fairing.

4. A ducted fan gas turbine engine as claimed in claim 1 wherein each of said doors is actuated by a pneumatic servo unit.

5. A ducted fan gas turbine engine as claimed in claim 4 wherein all of said doors are actuated by a common servo unit.

* * * * *